(No Model.)
A. F. FROST.
HOLDER FOR FRUIT JARS.
No. 476,790. Patented June 14, 1892.
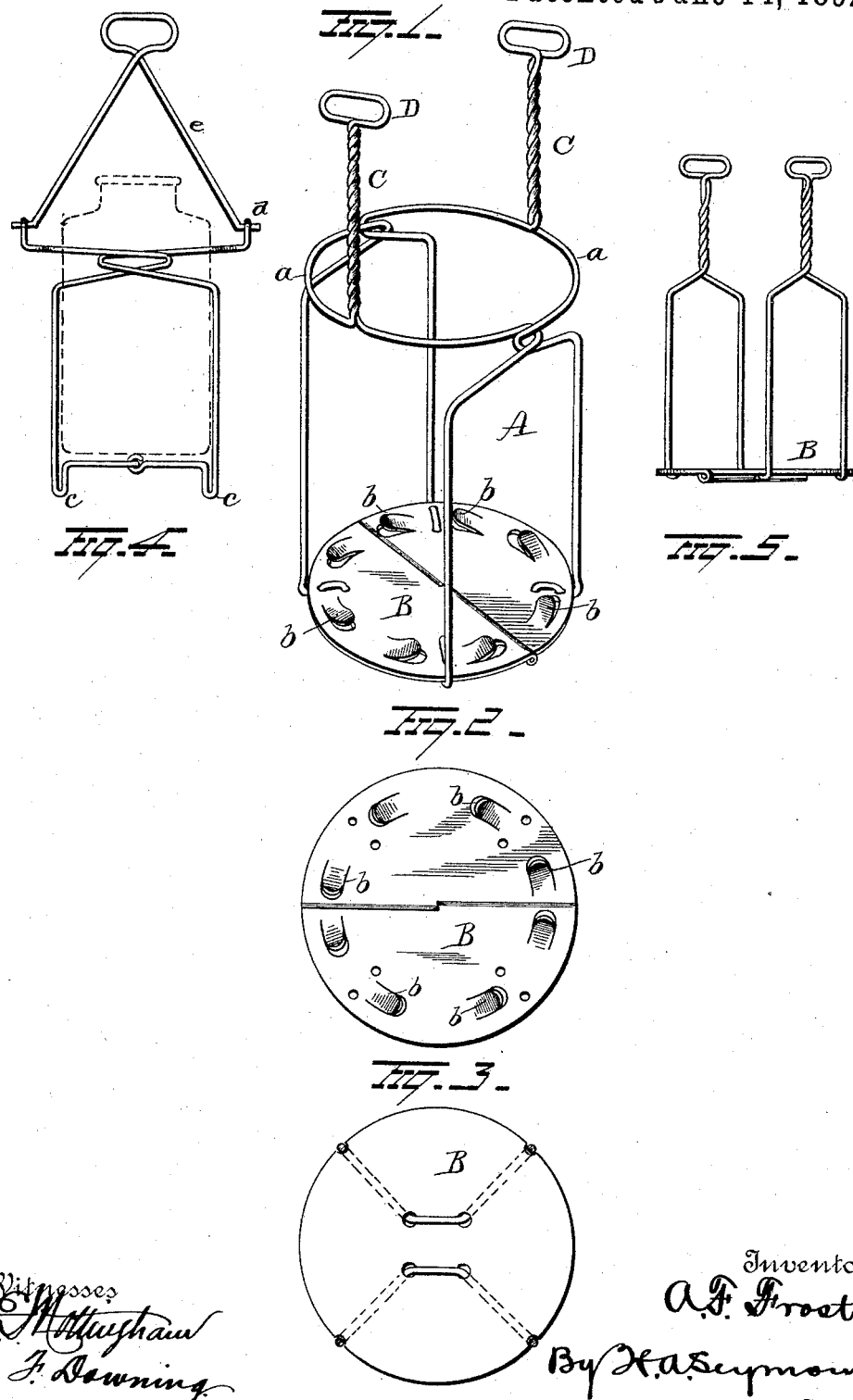
Witnesses
O. M. Hughaw
G. F. Downing
Inventor
A. F. Frost
By H. A. Seymour
Attorney

UNITED STATES PATENT OFFICE.

ARTEMESIA F. FROST, OF SHUBERT, NEBRASKA.

HOLDER FOR FRUIT-JARS.

SPECIFICATION forming part of Letters Patent No. 476,790, dated June 14, 1892.

Application filed September 5, 1891. Serial No. 404,804. (No model.)

*To all whom it may concern:*

Be it known that I, ARTEMESIA F. FROST, a resident of Shubert, in the county of Richardson and State of Nebraska, have invented certain new and useful Improvements in Racks or Holders for Fruit-Jars; and I do hereby declare the following to be a full, clear, and exact description of the invention, such as will enable others skilled in the art to which it appertains to make and use the same.

My invention relates to an improvement in racks or holders for fruit-jars, the object being to provide an improved rack for holding or supporting a jar of fruit while the fruit is being cooked.

A further object is to provide a fruit-jar holder adapted to support a jar while its contents are being cooked and to construct said holder in such manner that it will be adapted to hold jars of various sizes.

A further object is to construct a fruit-jar holder in such manner that the weight of the jar will tend to clamp the holder to it.

A further object is to construct a fruit-jar holder which shall be simple in construction and effectual in the performance of its functions.

With these objects in view the invention consists in certain novel features of construction and combinations and arrangements of parts, as hereinafter set forth, and pointed out in the claims.

In the accompanying drawings, Figure 1 is a view illustrating my improvement. Fig. 2 is a detached view of the bottom plate. Figs. 3, 4, and 5 are views of modifications.

A represents a wire cage, rack, or holder, having secured to its lower end a bottom plate B and having arms C C projecting upwardly from its top and provided at their upper ends with loops or handles D. The wire composing the rack A is bent to encircle a jar near the shoulder thereof, as at *a*, the wire forming the encircling portion or ring *a* being loosely looped together, so that said ring *a* may be expanded or contracted to accommodate jars of different sizes. The bottom plate B is preferably made in two sections hinged together at their centers, one-half of the rack being attached to each section. In this manner the weight of the filled jar will cause the rack or holder to clamp the jar regardless of the size thereof.

If desired, the bottom plate B may be made in one piece and the wire composing the rack loosely connected thereto, as illustrated in Fig. 3. The bottom plate B is provided with a series of upturned spring-lips *b*, as shown in Figs. 1 and 2. By this construction it will be seen that if the jar slips from the hands of the operator in the act of withdrawing it from the rack, as often occurs, it will be caught by the spring-lips *b*, and thus prevent the breaking of the jar, and, further, by this construction a free circulation of water or steam is permitted through the bottom B.

In lieu of the construction above described that shown in Fig. 4 may be adopted. In this case the bottom of the rack is formed by bending the wire composing the rack inwardly and hinging said parts together, the wire also being bent to produce legs *c*. The ring *a* is bent to form loops *d*, which are adapted to receive a handle *e* for handling the rack.

In the form of the invention shown in Fig. 5 the hinged metallic bottom plate is used; but the cage or rack is changed slightly. In this case the ring *a* is dispensed with and the two sides of the rack are adapted to embrace the jar.

A rack or holder such as above described will permit a fruit-jar to be located within a boiler to cook the contents of the jar, and a free circulation of water or steam will be permitted and the liability of the breakage of the jar will be very much reduced.

Having fully described my invention, what I claim as new, and desire to secure by Letters Patent, is—

1. A rack or holder for fruit-jars, comprising two parts provided with upward extensions and hinged together at the bottom in such a manner that the weight of a jar or other device placed on the bottom will cause the parts of the rack or holder to approach each other and thereby clamp the jar or article located between them, substantially as set forth.

2. In a rack or holder for a fruit-jar, the combination, with a bottom, of a body portion made of wire, said parts of the body being loosely looped together, so that said body may be expanded or contracted to accommodate jars of various sizes, substantially as set forth.

3. In a fruit-jar holder or rack, the combination, with a body portion, of a sectional metallic bottom, the said connections hinged together, substantially as set forth.

4. In a fruit-jar holder or rack, the combination, with a body portion, of a metallic bottom connected thereto, said bottom being made of two parts hinged together, and spring-lips projecting upwardly from said bottom, substantially as set forth.

In testimony whereof I have signed this specification in the presence of two subscribing witnesses.

ARTEMESIA F. FROST.

Witnesses:
LEONARD L. FROST,
A. D. CLOYD.